(12) United States Patent
Bernitz et al.

(10) Patent No.: US 6,686,828 B2
(45) Date of Patent: Feb. 3, 2004

(54) HIGH-TEMPERATURE DETECTOR AND METHOD OF PRODUCING THE SAME

(76) Inventors: Georg Bernitz, Koenigsweiherstrasse 5, 90455 Nuremberg (DE); Heinrich Zitzmann, Bluetenweg 14, 91207 Lauf en der Pegnitz (DE)

( * ) Notice: Subject to any disclaimer, the term of this patent is extended or adjusted under 35 U.S.C. 154(b) by 69 days.

(21) Appl. No.: 10/060,573

(22) Filed: Jan. 30, 2002

(65) Prior Publication Data

US 2002/0118093 A1 Aug. 29, 2002

(51) Int. Cl.$^7$ ................................ H01L 7/02
(52) U.S. Cl. .................... 338/25; 338/28; 29/612; 374/185
(58) Field of Search ............... 338/25, 28; 29/612; 374/185, 252, 253

(56) References Cited

U.S. PATENT DOCUMENTS

| | | | | |
|---|---|---|---|---|
| 3,105,229 A | * | 9/1963 | Sturm ........................... | 338/25 |
| 4,485,670 A | | 12/1984 | Camarda et al. .............. | 73/179 |
| 4,505,807 A | * | 3/1985 | Yamada ........................ | 338/25 |
| 5,142,266 A | * | 8/1992 | Friese et al. ................. | 338/22 R |
| 5,207,765 A | * | 5/1993 | Eiermann et al. .......... | 73/204.26 |
| 5,334,350 A | * | 8/1994 | Friese et al. .................. | 422/98 |
| 6,014,073 A | * | 1/2000 | Torii et al. .................... | 338/25 |
| 6,081,182 A | * | 6/2000 | Tomozawa et al. ........... | 338/25 |
| 6,140,906 A | * | 10/2000 | Kaihara et al. ............ | 338/22 R |
| 6,241,146 B1 | * | 6/2001 | Wienand et al. ......... | 228/248.1 |
| 6,353,381 B1 | * | 3/2002 | Dietmann et al. ............ | 338/25 |
| 6,380,840 B1 | * | 4/2002 | Wienand et al. .............. | 338/25 |

FOREIGN PATENT DOCUMENTS

| | | | | |
|---|---|---|---|---|
| DE | 44 45 243 A 1 | 6/1995 | ............ | G01K/7/18 |
| DE | 197 42 696 A 1 | 5/1999 | ............ | H01C/13/00 |
| DE | 197 50 123 A 1 | 6/1999 | ............ | G01K/7/18 |
| DE | 199 01 183 A 1 | 8/2000 | ............ | G01K/7/18 |
| DE | 199 01 184 C 1 | 10/2000 | ............ | G10K/7/18 |
| JP | 03-010131 | * 1/1991 | .................. | 374/185 |
| WO | WO 01/11325 A1 | 2/2001 | ............ | H01C/13/00 |

OTHER PUBLICATIONS

PCT International Search Report for PCT/EP00/06966 in the name of Georg Bernitz, mailed Jul. 20, 2000.

* cited by examiner

*Primary Examiner*—Karl D. Easthom
(74) *Attorney, Agent, or Firm*—Gardner Groff, P.C.

(57) ABSTRACT

A high-temperature detector comprises a temperature sensor comprising a high-temperature measuring element, a first connection and a second connection which are made of a high-temperature-stable material and which are connected to the measuring element. The high-temperature sensor is arranged in an elongate housing adjacent a first end thereof, and the housing comprises a first and a second conductor track produced from a high-temperature-stable material, the conductor tracks being connected to the first and second connections and extending in the direction of a second end of the housing. Furthermore, a connection point is provided, which is used for tapping a signal produced by the high-temperature sensor and which is arranged adjacent the second end of the housing. In order to produce such a device, the sensor is first provided and subsequently arranged in an opening of a first substrate adjacent a first end of the substrate. Following this, a second and a third ceramic substrate are fused with the first ceramic substrate so that the conductor tracks arranged in the second and third ceramic substrates are connected to the connections of the sensor, the conductor tracks extending to a respective second end of the second and third ceramic substrates.

10 Claims, 3 Drawing Sheets

HIGH-TEMPERATURE DETECTOR AND METHOD OF PRODUCING THE SAME

CROSS-REFERENCE TO RELATED APPLICATIONS

This application claims priority to, and is a National Phase filing of, PCT Application Serial No. PCT/EPO00/06966, filed Jul. 20, 2000, which claims priority to German Patent Application No. 19936924.0 filed Aug. 5, 1999.

BACKGROUND OF THE INVENTION

1. Field of the Invention

The present invention relates to a high-temperature detector and to a method of producing such a high-temperature detector.

2. Description of Related Art

In the prior art, platinum measuring resistors which are implemented in thin-film technology and which are adapted to be used in temperature ranges of up to 600° C. are widespread. Depending on the temperature range and the field of use, different embodiments have been developed. In the last few years, there has been an increasing demand for embodiments which are suitable to be used at higher temperatures (e.g. up to 800° C. or even up to 1,000° C. and more). Such platinum measuring resistors are described e.g. in the post-published references DE 199 01 183 A and DE 199 01 184.

When an article is used as a mass product, an especially economy-priced production, in addition to a reliable function, are often of the utmost importance.

EP-A-0 017 359 describes a ceramic sensor comprising an insulating substrate produced from a ceramic material. A pair of electric leads is implemented on the insulating substrate and covered by an insulating cover. At one end of the substrate, a pair of output connections is provided and, at the other end of the substrate, a sensor element is arranged, the sensor element being connected to the output connections via the electric leads.

SUMMARY OF THE INVENTION

It is the object of the present invention to provide a simple and economy-priced high-temperature detector and a simple and economy-priced method of producing a high-temperature detector.

The present invention is a hybrid high-temperature detector provided with a high-temperature sensor comprising a high-temperature measuring film, a first connection made of a high-temperature-stable material and a second connection made of a high-temperature-stable material, the connections being connected to the high-temperature measuring film; an elongate housing comprising a first elongate ceramic substrate, a second elongate ceramic substrate and a third elongate ceramic substrate, the elongate ceramic substrates being interconnected, the first elongate ceramic substrate being arranged between the second elongate ceramic substrate and the third elongate ceramic substrate and including a through-hole which is located adjacent a first end of the housing and in which the high-temperature sensor is arranged, the second and third ceramic substrates being arranged such that the hole in the first ceramic substrate is fully covered; a first conductor track consisting of a high-temperature-stable material on the second elongate ceramic substrate, the first conductor track being connected to the first connection of the high-temperature sensor and extending in the direction of a second end of the housing; a second conductor track consisting of a high-temperature-stable material on the third elongate ceramic substrate, the second conductor track being connected to the second connection of the high-temperature sensor and extending in the direction of a second end of the housing; and a connection point located adjacent the second end of the housing and adapted to have connected thereto electric leads via a non-high-temperature-stable material, a signal produced by the high-temperature sensor being adapted to be tapped via the connection point.

The present invention is a method of producing a hybrid high-temperature detector comprising the following steps: providing a high-temperature sensor comprising a high-temperature measuring film, a first connection made of a high-temperature-stable material and a second connection made of a high-temperature-stable material, the first and second connections being connected to the high-temperature measuring film; arranging the high-temperature sensor in a through-hole of a first ceramic substrate, the through-hole being arranged adjacent a first end of the first ceramic substrate; fusing the first ceramic substrate with a second ceramic substrate so that a conductor track arranged on the second ceramic substrate is connected to the first connection of the high-temperature sensor at a first end of the second ceramic substrate, the conductor track extending to a second end of the second ceramic substrate; fusing the first ceramic substrate to a third ceramic substrate so that a conductor track arranged on the third ceramic substrate is connected to the second connection of the high-temperature sensor at a first end of the third ceramic substrate, the conductor track extending to a second end of the third ceramic substrate; and applying a first connecting area to the second elongate ceramic substrate and a second connecting area to the third elongate ceramic substrate for connecting electric leads via a non-high-temperature-stable material so as to tap a signal produced by the high-temperature sensor.

BRIEF DESCRIPTION OF THE DRAWINGS

In the following, preferred embodiments of the present invention will be explained in detail making reference to the drawings enclosed, in which.

DESCRIPTION OF THE PREFERRED EMBODIMENTS

Figure 1:
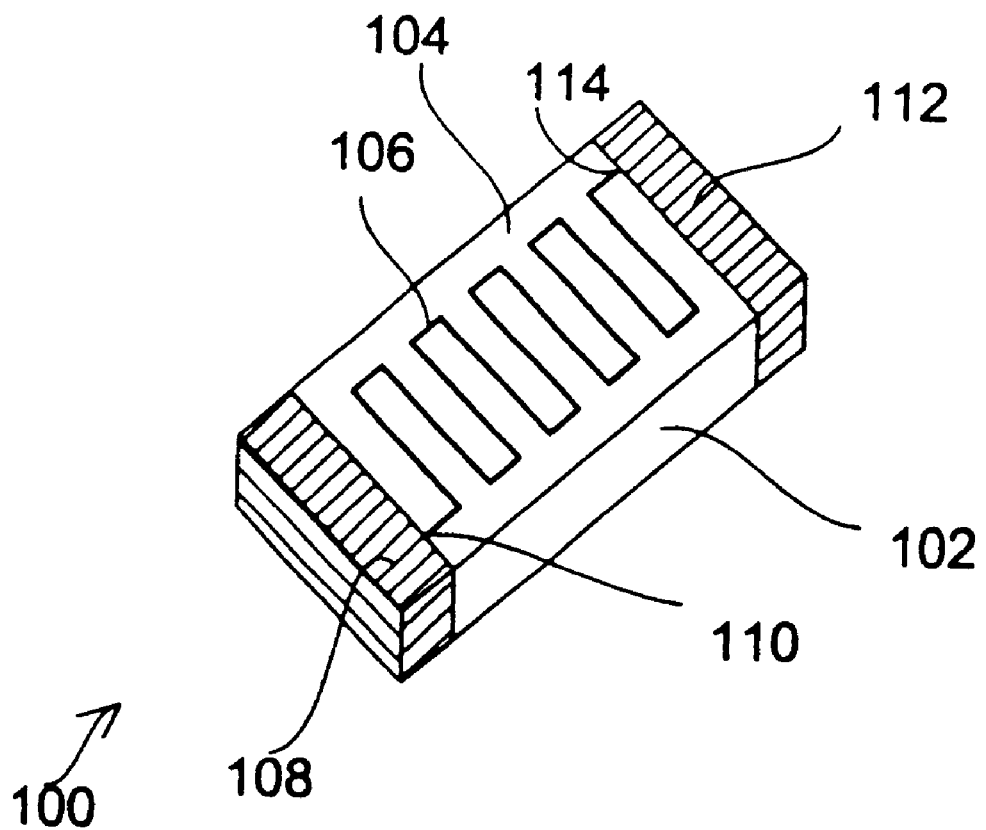
FIG. 1 shows a platinum SMD chip.

In the following description of the preferred embodiments of the present invention, identical reference numerals are used for identical or similar elements in different figures.

The present invention proceeds from so-called SMD chips which can be produced at a moderate price and which are known for applications in the low temperature range, e.g. up to 150° C., with solderable contacts. For cases of use involving very high temperatures, substantial modifications are, however, necessary for ensuring a reliable protection of the platinum resistance layer in adverse ambient conditions (preventing problematic foreign matter from diffusing into the platinum) so as to guarantee reliable contacting of the electric leads for the measurement current. Special attention should be paid to the fact that the materials used should only be suitable materials which will not be decomposed electrochemically by the necessary measurement current at the aimed-at high temperatures which are used.

To begin with, a suitable SMD chip is to be produced, which differs from conventional embodiments insofar as the platinum film, which is applied to a ceramic substrate and which has already been patterned, is not covered by a protective glaze and insofar as the contacting areas do not consist of silver or a silver alloy (e.g. Ag/Pd) but of pure platinum.

FIG. 1 shows such an SMD chip 100 which comprises a ceramic substrate 102 produced e.g. from $AL_2O_3$. A first main surface 104 of the ceramic substrate 102 has applied thereto a patterned measuring film 106 consisting e.g. of platinum or of a platinum film lightly alloyed with rhodium. A first connection 108 is formed, which is connected to a first end 110 of the measuring film 106. As can be seen from FIG. 1, the first connection 108 extends from the first main surface 104 of the ceramic substrate 102 across lateral surfaces of the ceramic substrate 102 onto the second main surface thereof. A second connection 112, which is connected to a second end 114 of the measuring film 106, is defined n the same way.

In the embodiment shown in FIG. 1, the measuring film 106, the first connection 108 and the second connection 112 are made of the same high-temperature-stable material, e.g. platinum. In the case of a further embodiment different materials may, however, be used as well, provided that they have the necessary high-temperature stability. Possible materials are platinum alloys and, for simple applications (approx. 800° C.), nickel and nickel alloys.

The SMD chip 100 shown in FIG. 1 is therefore a high-temperature sensor, a high-temperature measuring element being defined by the film 106.

Figure 2:
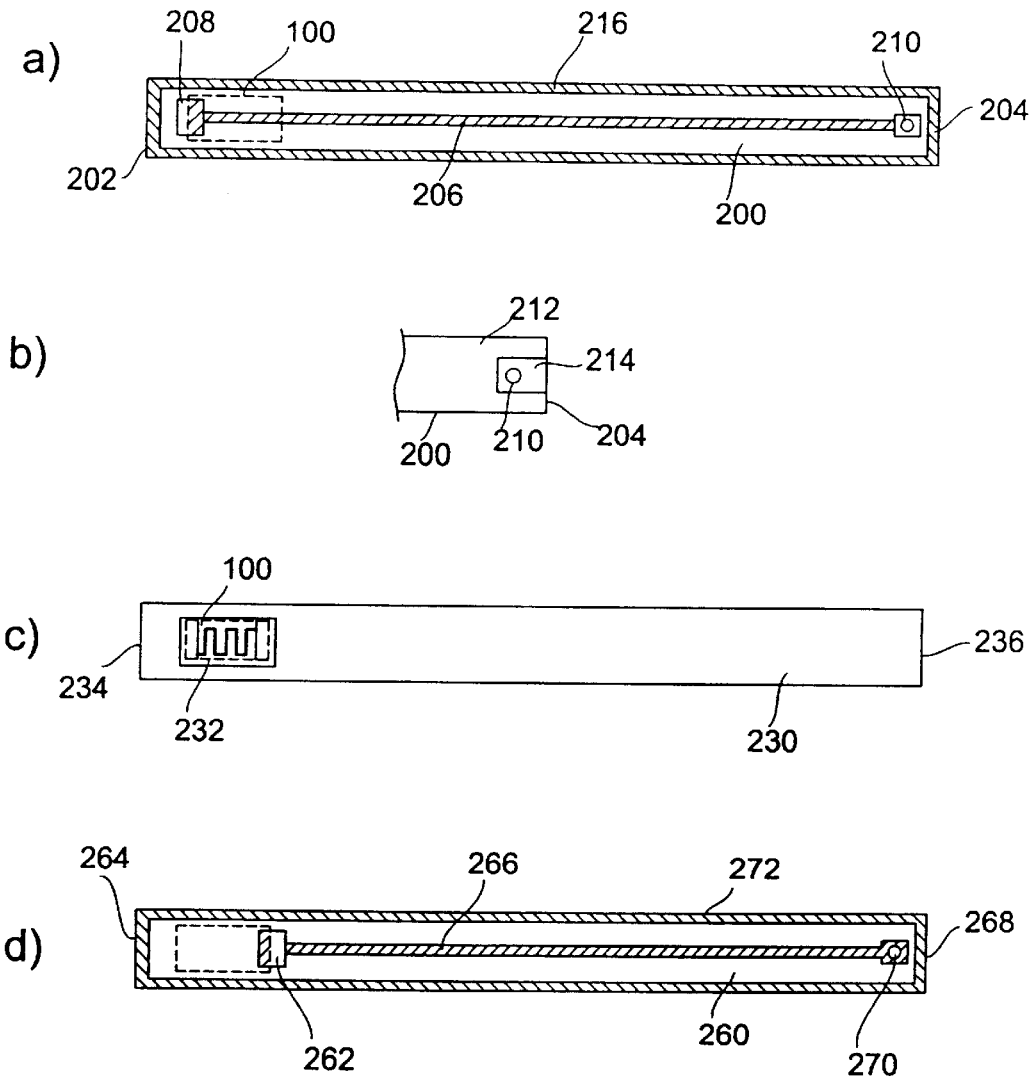
FIGS. 2a to 2d show the individual ceramic substrates used for producing the housing.

Making reference to FIG. 2, the individual ceramic substrates used for producing the housing of the device according to the present invention will be described in detail hereinbelow.

FIG. 2a shows a first or lower ceramic substrate or ceramic cover platelet 200, the surface shown here being the surface located in opposed relationship with the high-temperature sensor or SMD chip in the assembled condition of the housing. To make things easier, this side is referred to as "inner side". In FIG. 2a, the area in which the ceramic substrate 200 and the SMD chip 100 are arranged in an overlapping mode of arrangement is represented by a dashed line. The second end of the ceramic substrate 200 is designated by reference numeral 204. The inner side of the ceramic substrate 200 has formed thereon a conductor track 206 consisting of a high-temperature-stable material, such as platinum or a platinum alloy (e.g. PtRh).

Adjacent the first end 202 of the ceramic substrate 200, the conductor track 206 is provided with a contact pad 208 by means of which the conductor track 206 is contacted via the contact 208 with the first connection 108 of the SMD chip 100 (cf. FIG. 1) when the detector is being assembled. As can be seen, the conductor track 206 extends from the contact point 208 in the direction of the second end 204 of the ceramic substrate 200, a through-contacting means 210 being provided at the conductor track end which is arranged adjacent the second end 204 of the ceramic substrate 200, and the conductor track 206 being routed with the aid of this through-contacting means 210 from the "inner side" of the ceramic substrate 200 shown in FIG. 2a to the "outer side" 212 of the ceramic substrate 200 which is partly shown in FIG. 2b. As can be seen in FIG. 2b, a connecting area 214 is arranged on the "outer side" 212 of the ceramic substrate 200.

Figure 4:
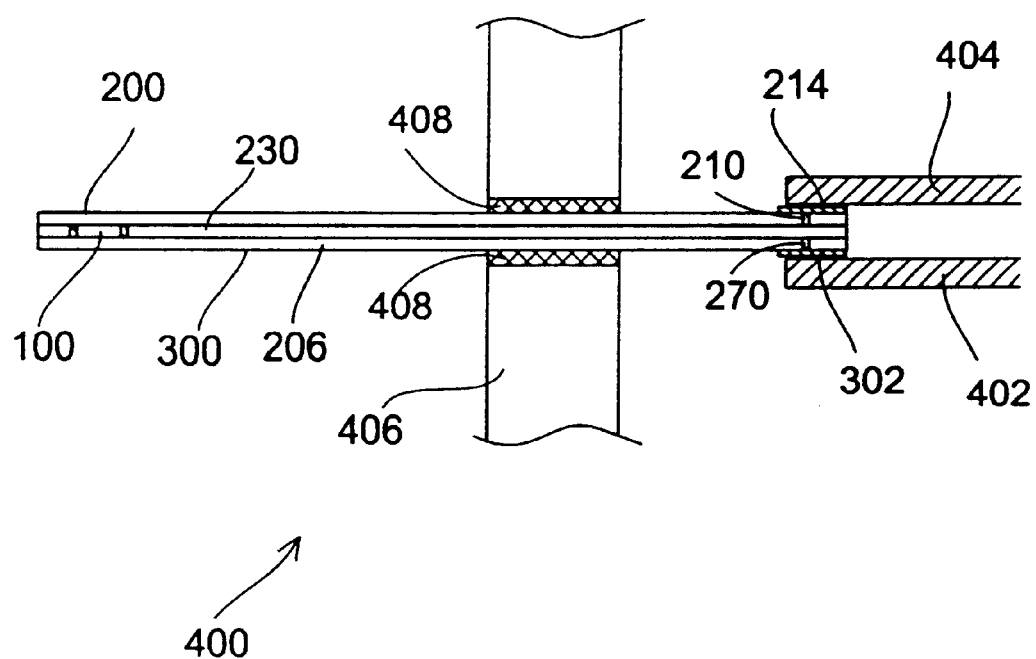
FIG. 4 shows a high-temperature sensor according to a further embodiment of the present invention.

In the case of another implementation of the conductor track, the through-contacting means can be dispensed with (FIG. 4). The first (middle) ceramic substrate comprises here at the second end a metallization of approx. 3 mm length on the front and on the back thereof. The two outer ceramic substrates (second and third ceramic substrate) are in this embodiment so conceived that they are approx. 2 mm shorter. This has the effect that, in the area of the second ends of the second and third ceramic substrates, a respective overlapping zone with the metallization of the first ceramic substrate exists, and, outside of the overlapping zone, the metallizations of the first ceramic substrate each define a connecting area used e.g. for attaching a connecting wire thereto by means of welding.

In an embodiment in which both (wire) contacts are to be positioned on one side of the finished sensor element a combination of the above-described conductor track implementations can be used (1×through-contacting −1×overlapping).

The ceramic substrate 200 is provided with a glaze 216 on the boundary thereof; when the individual elements of the housing are being assembled, this glaze 216 will have the effect that the individual ceramic substrates, part of which still has to be described, will fuse hermetically.

In FIG. 2c a second ceramic substrate 230 is shown, which is made of the same material as the first substrate 200 that has been described making reference to FIG. 2a and 2b. The second or middle ceramic substrate 230 does not comprise any conductor track structures, but it is only provided with an opening or a cut-out portion 232 into which the SMD chip 100 (represented by dashed lines), which has been described making reference to FIG. 1, is inserted. The opening 232 is arranged adjacent a first end 234 of the second ceramic substrate 230, and the second end of the ceramic substrate 230 is designated by reference numeral 236.

FIG. 2d shows an "upper" ceramic cover platelet or third ceramic substrate 260, whose structural design is substantially identical with that of the ceramic platelet 200 which has been described making reference to FIG. 2a, except for the fact that the contact area 262 used for contacting the second connection 112 (cf. FIG. 1) of the SMD chip 100 is located farther away from the first end 264 of the third ceramic substrate 260; this is due to the different mode of arrangement of the respective connections on the SMD chip 100. Like the contact 208 that has been described making reference to FIG. 2a, also contact 262 is used for electrically contacting the SMD chip 100 via the second connection 112 (cf. FIG. 1). Starting from the contact 262, a conductor track 266 extends in the direction of the second end 268 of the third substrate 260; the conductor track 266 may be produced from materials corresponding to those of the conductor track described in connection with FIG. 2a. Similar to FIG. 2a, FIG. 2d shows the "inner side" of the ceramic substrate 260, i.e. the side which is located in opposed relationship with the second substrate 230 in the assembled condition. A through-contacting means 270 is provided adjacent the second end 268 of the third substrate 260; similar to the first ceramic substrate, this through-contacting means 270 serves to extend the conductor track 266 to the "outer side" where it is connected to a connection which is not shown in FIG. 2d.

As has been mentioned above, the SMD chip 100 described on the basis of FIG. 1 is housed in a special ceramic structure comprising the first to third ceramic substrates 200, 230, 260; in so doing, the chip connecting and contacting areas 108, 112 are contacted with the platinum conductor tracks 206, 266 of the respective lower and upper ceramic cover platelets 200, 260. Hence, the structural design of the ceramic housing comprises a total of three superimposed platelets 200, 230, 260, which may have typical dimensions of e.g. 25 mm×3 mm×0.3 mm (length, width, thickness). The lower and upper cover platelets 200, 260 are each provided with a longitudinally routed platinum conductor track 206, 266, each of these conductor tracks 206, 266 being through-contacted to an outer contact area 214 at a respective end, as can be seen in FIG. 2a and 2d. The middle platelet 230 is provided with a rectangular, cutout portion 262 into which the SMD chip 100 can be inserted in the manner shown in FIG. 2c.

Figure 3:
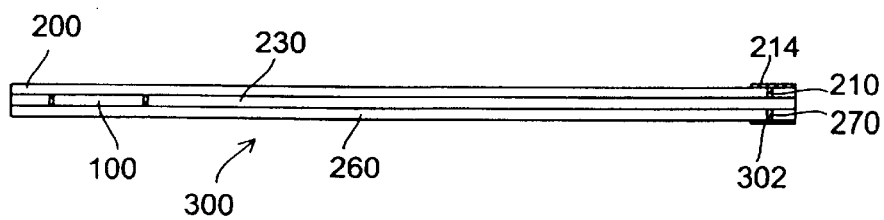
FIG. 3 shows the housing composed of the ceramic substrates.

FIG. 3 shows the housing 300 obtained by the combination of the three ceramic platelets.

200, 230 and 260. In addition to the elements which have already been described making reference to FIG. 2, also the connection 302 on the outer side of the third substrate 260 can be seen in FIG. 3, the conductor track in the third substrate 260 being extended to this connection 302 on the outer side via the through-contacting means 270.

In the sequence of process steps, the lower ceramic cover platelet 260 can first be tightly fused with the middle ceramic platelet 230, e.g. by means of the glaze paste 272 applied to part of the lower cover platelet (cf. FIG. 2d). The platinum conductor track 266 on the inner and/or upper side of the lower platelet 260 is routed such that it projects up to the "front" contact position of the SMD chip 100 into the cut-out portion 262 of the middle platelet 230 placed on top of this lower platelet 260.

This conductor track piece located within the cut-out portion 262 has now applied thereto a small "drop" of thick-film conductor paste (e.g. platinum), and, subsequently, the SMD chip is placed in the cut-out portion in such a way that a contact connection 112 of the SMD chip 100 is electrically connected to this lower conductor track 266. The opposed contact connection 108 of the SMD chip 110 is now provided with a "drop" of platinum thick-film paste on the upper side thereof and the upper ceramic cover platelet 200 (whose conductor track 206 faces downwards) is placed on top of the middle ceramic platelet 230 in such a way that the inserted SMD chip 100 is electrically connected by means of the previously applied platinum paste to the downward facing conductor track 206 of the upper ceramic platelet 200. Part of the lower and/or inner side of the upper ceramic cover platelet 200 has already been provided with a glaze layer 216 in a preceding process step so that the cover platelet 200 can be fused tightly with the middle platelet 230 including the SMD chip 100 in a burning process. The burning process which has just been described takes place at a temperature between 1200° C. and 1450° C. for a period of approx. 30 minutes (peak duration). For the glaze paste a frit 1 consisting of $SiO_2$(46.6%), BaO(39.2%), $Al_2O_3$(12.7%), CaO(0.5%), SrO(0.5%) or a frit 2 consisting of $SiO_2$(20.5%), $Al_2O_3$(55.0%), CaO(19.0%), MgO (5.5%) is preferably used (weight percent in parentheses).

The SMD element is hermetically sealed in the interior of the three ceramic platelets 200, 230, 260 in the manner described hereinbefore, and the electric connection is routed via the conductor tracks 206, 266 and the through-contacting means 210, 270 to the outer contact areas 214, 302.

A further embodiment is given when a so-called "green ceramic" is used instead of the first, second and third ceramic platelets. The glaze paste required for fusing the ceramic platelets need not be printed on in this case, since the three green ceramic foils (which have already been equipped with the SMD chip and onto which the platinum conductor paste has already been printed) sinter such that they define a hermetically sealed unit when the entire layered structure is subjected to a suitable firing process (T>1,200° C.).

Provided that the housing 300 has a suitable overall length, this structural design offers the possibility of the outer contact connection having a temperature which is markedly lower than that of the sensor tip (SMD chip).

This effect can be supported still further in that a "partition" becomes effective approximately in the middle of the device, as will be described hereinbelow making reference to FIG. 4. FIG. 4 shows a sensor 400 according to a further embodiment of the present invention, and this sensor comprises the housing 300 described according to FIG. 3. As can be seen, the respective lead is attached to the end of the housing 300 located in spaced relationship with the SMD chip 100 in the example shown in FIG. 4, the lead being implemented in the form of first and second lead-in wires 402 and 404.

At a position along the housing 300 which is less remote from the connecting areas 210 and 302, a partition 406 consisting of metal (e.g. Cr steel) or ceramic (e.g. $Al_2O_3$ or ceramic 221) is arranged. A sealing compound 408 is arranged between the housing 300 and the partition 406, the sealing compound being produced e.g. from a glaze having a suitable coefficient of thermal expansion (frit 1) or from a ceramic paste (e.g. Cotronics 989).

The essential advantage of the device according to the present invention is that the contact points 210, 302 for the electric leads 402, 404, which are subjected to substantial thermal loads especially at the extremely high temperatures involved in the present connection, can, at a moderate price, be placed in a zone where the temperature is much lower. The costs for the "long" ceramic platelets 200, 230, 260 of the housings 300 are, per unit area, much lower than the costs of the platinum-coated thin-film ceramic for the temperature sensor or high-temperature sensor 100, whereas the size of the SMD elements 100, which represent the sensitive part, can be kept comparatively small and therefore moderate in price.

A further advantage, which is also very important, can be achieved by the above-described structural design in cases in which a short response time for the temperature sensor is required. In these cases, an optimum coupling to the measurement medium can be achieved by advantageously chosen dimensions (thin ceramic platelets) as well as, in particular, by the possibility of dispensing with an additional protective tube for the temperature sensor, which is normally necessary in conventional structural designs.

While the preferred embodiments of the invention have been described, it will be obvious to those skilled in the art that various modifications and variations my be made thereto without departing from the spirit and scope of the invention as defined hereinafter in the appended claims.

What is claimed is:

1. A method of producing a hybrid high-temperature detector comprising
   a high-temperature sensor chip comprising a high-temperature measuring film, a first connection made of a high-temperature-stable material and a second connection made of a high-temperature-stable material, the first and second connections being connected to the high-temperature measuring film; the method comprising:

a) arranging the high-temperature sensor chip in a through-hole of a first ceramic substrate, the through-hole being arranged adjacent to a first end of the first ceramic substrate;

b) fusing the first ceramic substrate with a second ceramic substrate so that a conductor track arranged on the second ceramic substrate is connected to the first connection of the high-temperature sensor chip at a first end of the second ceramic substrate, the conductor track extending to a second end of the second ceramic substrate;

c) fusing the first ceramic substrate to a third ceramic substrate so that a conductor track arranged on the third ceramic substrate is connected to the second connection of the high-temperature sensor chip at a first end of the third ceramic substrate, wherein the fusing of the ceramic substrates seals the sensor chip from the atmosphere; and d) applying a first connecting area to the second elongate ceramic substrate and a second connecting area to a third elongate ceramic substrate for connecting electrical leads via a non-high-temperature-stable material so as to tap a signal produce by the high-temperature sensor chip.

2. A method according to claim 1 comprising the following step: contacting the first and second conductor tracks with first and second connecting areas arranged adjacent the respective second end of the second and third ceramic substrates.

3. A method according to claim 1 comprising the following step: arranging a thermal partition on the housing obtained by fusing the first, second, and third ceramic substrates, the thermal partition being arranged at a position between a first and a second end of the housing.

4. A method of producing a hybrid high-temperature detector comprising a high-temperature sensor chip (100) comprising a high-temperature measuring film (106), a first terminal made of a high-temperature-stable material (108) and a second terminal (112) made of a high-temperature-stable material, the first and second terminals being connected to the high-temperature measuring film (106), the method comprising:

a) arranging the high-temperature sensor (100) in a through recess (232) of a first ceramic green sheet (230), the through recess (232) being arranged adjacent to a first end (234) of the first ceramic green sheet (230);

b) sintering the first ceramic green sheet (230) with a second ceramic green sheet (200) and a third ceramic green sheet, wherein a conductor trace (206) arranged on the second ceramic green sheet is connected to the first terminal (108) of the high-temperature sensor chip(100) at a first end (264) of the second ceramic green sheet, the conductor trace (206) extending to a second end of the second ceramic green sheet (200), wherein a conductor trace (266) arranged on the third ceramic green sheet (260) is connected to the second terminal (112) of the high-temperature sensor chip(100) at a first end (264) of the third ceramic green sheet, and the conductor trace (266) extending to a second end of the third ceramic green sheet, wherein upon sintering, the sensor chip is sealed from the atmosphere; and c) applying a first terminal pad (14) and a second terminal pad (302) to the housing for connecting electrical leads (402, 404) via a non-high-temperature-stable material so as to tap a signal produced by the high-temperature sensor chip(100).

5. A method according to claim 4 comprising the following step:

Arranging a thermal partition (406) on the housing obtained by sintering the first, second and third ceramic green sheets, the thermal partition being arranged at a position between a first and a second end of the housing.

6. Method according to claim 5, wherein the thermal partition (406) is made of a metal or a ceramic material.

7. Method according to claim 4, wherein the high-temperature measuring film (106) is a patterned film of a high-temperature stable material, wherein the first terminal (108), the second terminal (112) and the patterned film (106) are made of the same high-temperature stable material and formed on a ceramic substrate (102).

8. Method according to claim 7, wherein the first and the second conductor traces (206, 266) are made of the same high-temperature stable material of which the first terminal (108), the second terminal (112) and the patterned film (106) are made.

9. Method according to claim 4, wherein the first conductor trace (206) is arranged on a first surface of the second ceramic green sheet (200), the surface facing the first ceramic green sheet (230), and the conductor trace (206) being connected to the first terminal pad (214) via a through-contacting means (210) being adjacent to the second end (204); and the second conductor trace (266) is arranged on a first surface of the third ceramic green sheet (260), the surface facing the first ceramic green sheet (230), and the conductor trace being connected to the second terminal pad (302) via a through-contacting means (270) being adjacent to the second end (268).

10. The hybrid high-temperature detector according to one of claim 4, wherein the high-temperature stable material is platinum.

* * * * *